United States Patent
Khan et al.

(10) Patent No.: US 7,500,225 B2
(45) Date of Patent: Mar. 3, 2009

(54) SQL SERVER DEBUGGING IN A DISTRIBUTED DATABASE ENVIRONMENT

(75) Inventors: Azeemullah Khan, Bellevue, WA (US); Daniel Hunter Winn, Kirkland, WA (US); Mason Bendixen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 677 days.

(21) Appl. No.: 10/775,624

(22) Filed: Feb. 10, 2004

(65) Prior Publication Data

US 2005/0193264 A1  Sep. 1, 2005

(51) Int. Cl.
    *G06F 9/44* (2006.01)
(52) U.S. Cl. .................................... 717/124
(58) Field of Classification Search ......... 717/124–129
    See application file for complete search history.

(56) References Cited

U.S. PATENT DOCUMENTS

| | | | |
|---|---|---|---|
| 5,900,870 A | 5/1999 | Malone et al. ............. 345/333 |
| 6,047,291 A | 4/2000 | Anderson et al. .......... 707/103 |
| 6,058,393 A * | 5/2000 | Meier et al. ............... 707/10 |
| 6,108,004 A | 8/2000 | Medl ......................... 345/346 |
| 6,112,024 A | 8/2000 | Almond et al. ............ 395/703 |
| 6,199,195 B1 | 3/2001 | Goodwin et al. ............. 717/1 |
| 6,202,200 B1 * | 3/2001 | House et al. ............... 717/100 |
| 6,253,368 B1 * | 6/2001 | Nelin et al. ................. 717/124 |
| 6,324,683 B1 * | 11/2001 | Fuh et al. .................... 717/124 |
| 6,338,056 B1 | 1/2002 | Dessloch et al. ............. 707/2 |
| 6,370,541 B1 | 4/2002 | Chou et al. ................. 707/103 |
| 6,519,597 B1 | 2/2003 | Cheng et al. ................ 707/10 |
| 6,556,983 B1 | 4/2003 | Altschuler et al. ........... 706/55 |
| 6,578,046 B2 | 6/2003 | Chang et al. ............... 707/103 |
| 6,647,382 B1 | 11/2003 | Saracco ....................... 707/3 |
| 6,772,178 B2 | 8/2004 | Mandal et al. ............. 707/204 |
| 7,017,151 B1 * | 3/2006 | Lopez et al. ............... 717/127 |
| 7,107,578 B1 * | 9/2006 | Alpern ...................... 717/124 |
| 7,117,483 B2 * | 10/2006 | Dorr et al. ................. 717/124 |
| 7,155,426 B2 * | 12/2006 | Al-Azzawe .................. 707/3 |
| 2002/0091702 A1 | 7/2002 | Mullins ..................... 707/100 |
| 2002/0152422 A1 | 10/2002 | Sharma et al. .............. 714/13 |
| 2002/0198891 A1 | 12/2002 | Li et al. .................... 707/102 |
| 2003/0056198 A1 | 3/2003 | Al-Azzawe et al. ........ 717/127 |
| 2003/0066053 A1 | 4/2003 | Al-Azzawe ................ 717/127 |

OTHER PUBLICATIONS

Kiesling, R., "ODBC in UNIX Environments", *Dr. Dobb's Journal*, Dec. 2002, 27(12), 16-22.

Mallet, S. et al., "Myrtle: A Set-Oriented Meta-Interpreter Driven by a "Relational" Trace for Deductive Databases Debugging", *Lecture Notes in Computer Science*, 1999, 1559, 328-330.

(Continued)

*Primary Examiner*—Wei Y. Zhen
*Assistant Examiner*—Philip R. Wang
(74) *Attorney, Agent, or Firm*—Woodcock Washburn LLP (57) ABSTRACT

A software architecture for debugging the execution of T-SQL and managed data-tier application logic associated with a single connection, in isolation from other connections, is provided. In the architecture, a database server hosts the data-tier application logic. A client connects to the database server and issues requests on the connection, which initiates the execution of the data-tier application logic. A debugger debugs a client process on the server. An application program interface (API) receives a request to initiate a debugging session from the debugger, and returns an interface pointer to the debugger, thereby enabling the debugger to debug the client connection to the server.

27 Claims, 6 Drawing Sheets

OTHER PUBLICATIONS

Ottogalli, F.G. et al., "Visualisation of Distributed Applications for Performance Debugging", *Lecture Notes in Computer Science*, Jan. 2001, 2074, 831-840.

Andrews, T. et al., "Combining Language and Database Advances in an Object-Oriented Development Environment", *OOPSLA Proceedings*, Oct. 4-8, 1987, 430-440.

Beard, et al., "Multilevel and Graphical Views of Metadata", *Research and Technology Advances in Digital Libraries*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems* G.M. Nijssen, (ed); North Holland Publishing Company: 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object-Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serialization in Java 1.1. Making Objects Persistent, *WEB Techniques*, 1997, 2(9), 55, 58-59.

"Developer's Guide to Apple Data Detectors—For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al., "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assets to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al."Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digial Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series*, vol. 3, *Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

King et al, "TriStarp—An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002,14(6), 1330-1346.

Mariani, J. A., Oggetto: "An Object Oriented Database Layered on a Triple Store", *The Computer Journal*, 1992, 35(2),108-118.

McMahon, L.E, "SED—A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2),403-412.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, Reference, Identifiers, and Equality White Paper", (Jul. 2, 1993), OMG TC Document 93.7.5, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing" , *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases—Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

\* cited by examiner

SQL SERVER DEBUGGING IN A DISTRIBUTED DATABASE ENVIRONMENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention relates to electronic database systems. More particularly, the present invention relates to a software architecture that permits a Structured Query Language (SQL) debugger to debug a client process that uses any SQL SERVER—compliant protocol.

BACKGROUND OF THE INVENTION

Microsoft SQL SERVER is a comprehensive database management platform that provides extensive management and development tools, a powerful extraction, transformation, and loading (ETL) tool, business intelligence and analysis services, and other capabilities. Among other improvements, the Microsoft Windows .NET Framework Common Language Runtime (CLR) has been recently integrated into the SQL SERVER database.

The CLR is the heart of the Microsoft .NET Framework, and provides the execution environment for all .NET code. Code that runs within the CLR is referred to as "managed code." The CLR provides various functions and services required for program execution, including just-in-time (JIT) compilation, allocating and managing memory, enforcing type safety, exception handling, thread management and security. The CLR is now loaded by SQL SERVER upon the first invocation of a .NET routine.

In previous versions of SQL SERVER, database programmers were limited to using Transact-SQL (T-SQL) when writing code on the server side. T-SQL is an extension of SQL as defined by the International Standards Organization (ISO) and the American National Standards Institute (ANSI). Using T-SQL, database developers can create, modify and delete databases, tables and other objects, as well as insert, retrieve, modify and delete data stored in a database. T-SQL is specifically designed for direct declarative data access and manipulation. While T-SQL excels at structural data access and management, it is not as capable as languages such as Visual Basic .NET and C#. For example, T-SQL does not support arrays, collections, for each loops, bit shifting or classes.

With the CLR integrated into the SQL SERVER database, database developers can now perform tasks that were difficult or even impossible to achieve with T-SQL alone. Both Visual Basic .NET and C# are modern programming languages offering full support for arrays, structured exception handling, and collections. Developers can leverage CLR integration to write code that has more complex logic and is more suited for computational tasks using languages such as Visual Basic .NET and C#.

As is the case with any type of software code, debugging is an essential step in assuring that the code operates as intended, and without errors. Unfortunately, existing T-SQL debugging architectures have shortcomings that adversely affect the development experience. For example, existing T-SQL debugging architectures require the involvement of the client driver during the setup of debugging. As a result, only applications using drivers specifically designed for T-SQL debugging can be debugged. Thus, Simple Object Access Protocol (SOAP) connections over HyperText Transfer Protocol (HTTP), and connections using drivers that do not account for T-SQL debugging, cannot be accessed by the debugger.

A further shortcoming of an existing debugger is such a debugger's limited functionality. For example, an existing debugger is limited to debugging persisted T-SQL stack frames, because the debugger cannot debug dynamic, non-persisted T-SQL stack frames. In addition, conventional debuggers are not able to switch between debugging T-SQL and managed code that operates within the CLR. With the integration of the CLR into the SQL SERVER database, such a shortcoming adversely affects the development environment. Furthermore, existing debuggers do not limit the user interface display of activity on the server to the managed code connection being debugged. As a result, a developer is overwhelmed with information from all threads, many of which may be irrelevant to the developer's debugging task at hand.

Accordingly, what is needed is a debugging architecture that addresses the limitations and shortcomings addressed above. More particularly, what is needed is a debugging architecture that is independent from the client driver, and therefore independent from the client protocol, thereby enabling debugging of server activity related to any SQL SERVER client connection. Even more particularly, what is needed is an architecture that enables debugging of dynamic T-SQL stack frames, as well as both T-SQL and managed code, by way of a user interface that only displays the activity within the server on the connection being debugged.

SUMMARY OF THE INVENTION

In light of the foregoing limitations and drawbacks, a software architecture for debugging the execution of T-SQL and managed data-tier application logic associated with a single connection, in isolation from other connections, is provided. In the architecture, a database server hosts the data-tier application logic. A client connects to the database server and issues requests on the connection, which initiates the execution of the data-tier application logic.

A debugger debugs a client process on the server. An application program interface (API) receives a request to initiate a debugging session from the debugger, and returns an interface pointer to the debugger, thereby enabling the debugger to debug the client connection to the server.

In one embodiment, the API receives a remote debugger request to debug managed code and causes the server to call a remote debugging component, thereby enabling the debugger to debug the managed code by way of the remote debugging component. In another embodiment, the API detects a transition between T-SQL and managed code and calls a method to communicate the transition to the debugger. In yet another embodiment, the debugger comprises a user interface which displays only activity within the server on the client connection being debugged.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

A SQL SERVER debugging architecture that remedies the limitations and shortcomings discussed above is presented herein. For example, a SQL debugging Application Program Interface (API) in accordance with one embodiment of the present invention exposes a debugging registration mechanism that allows the debugger to register to debug connections from clients without regard for the client connection's driver or protocol. An embodiment of the present invention enables such protocol independence by removing the involvement of the client driver from the registration process, thereby enabling debugging of any client connection that is in operative communications with the SQL SERVER.

The architecture, according to an embodiment, also enables full debugging of T-SQL and managed stack frames by attaching the managed debugger to the SQL SERVER process on demand. The SQL debugging API notifies the debugger of transitions between T-SQL and managed code, thereby enabling the debugger to provide seamless stepping from T-SQL into managed code and vice-versa. Furthermore, in some embodiments, the API is designed such that a merged call stack of T-SQL code and managed code may be constructed by the debugger.

In addition, the SQL debugging API enables full debugging of dynamic T-SQL frames. Dynamic T-SQL is T-SQL code that is not persisted in the form of a T-SQL object such as a stored procedure of user-defined function. Rather, dynamic T-SQL is sent by a client application for execution.

According to yet another embodiment of the present invention, the T-SQL debugging model enables the SQL debugger to show a debugging user only the activity within the server on the connection being debugged. As a result, a user of a debugger, according to an embodiment of the present invention, who is debugging managed code running within SQL SERVER is provided with information scoped by the connection being debugged. In other words, only threads associated with the relevant connection are exposed to the user by the debugging user interface, thus providing a more manageable debugging user experience.

Before discussing the invention in detail, we will first describe exemplary computing and network environments in which the invention may be advantageously practiced.

Exemplary Computing Environment

Figure 1:
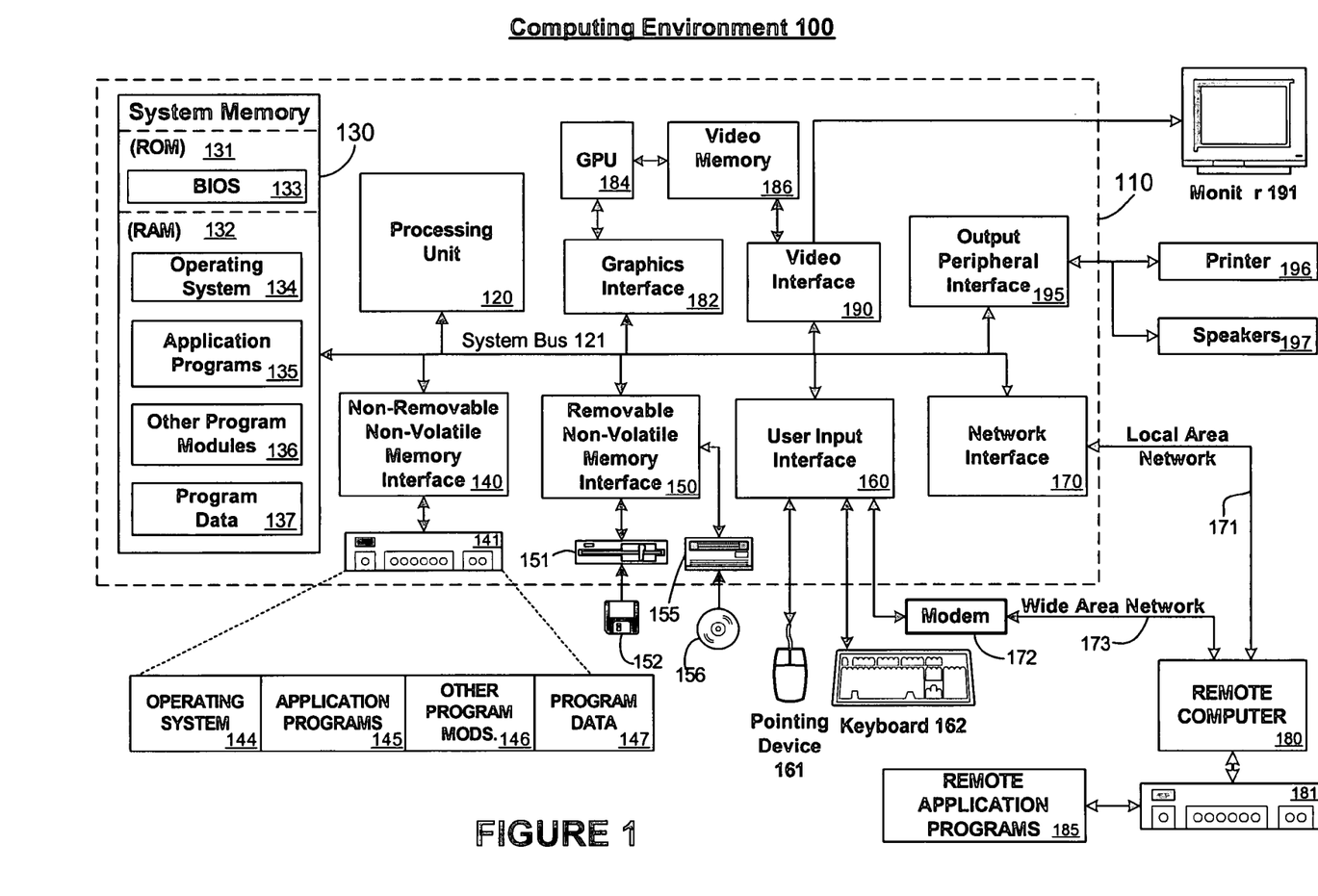
FIG. 1 is a diagram illustrating an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Network Environment

Figure 2A:
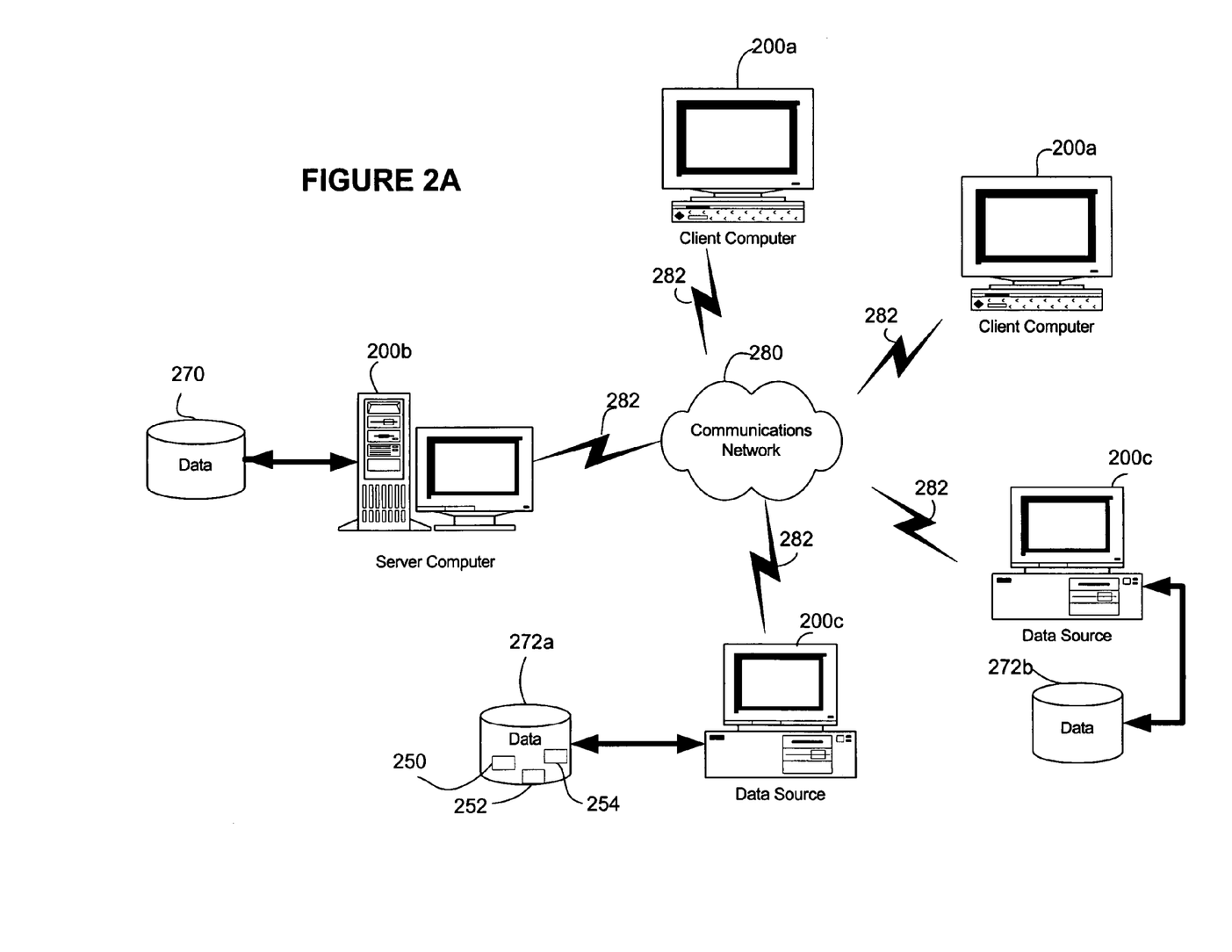
FIG. 2A is schematic diagram representing a network in which aspects of the present invention may be incorporated.

FIG. 2A illustrates an exemplary network environment in which the present invention may be employed. Of course, actual network and database environments may be arranged in a variety of configurations; however, the exemplary environment shown here provides a framework for understanding the type of environment in which the present invention operates.

The network may include client computers 200a, a server computer 200b, data source computers 200c, and databases 270, 272a, and 272b. The client computers 200a and the data source computers 200c are in electronic communication with the server computer 200b via communications network 280, e.g., an Intranet. Client computers 200a and data source computers 200c are connected to the communications network by way of communications interfaces 282. Communications interfaces 282 can be any one of the well-known communications interfaces such as Ethernet connections, modem connections, wireless connections and so on.

Server computer 200b provides management of database 270 by way of database server system software, described more fully below. As such, server 200b acts as a storehouse of data from a variety of data sources and provides that data to a variety of data consumers.

In the exemplary network environment of FIG. 2A, data sources are provided by data source computers 200c. Data source computers 200c communicate data to server computer 200b via communications network 280, which may be a LAN, WAN, Intranet, Internet, or the like. Data source computers 200c store data locally in databases 272a, 272b, which may be relational database servers, excel spreadsheets, files, or the like. For example, database 272a shows data stored in tables 250, 252, and 254. The data provided by data sources 200c is combined and stored in a large database such as a data warehouse maintained by server 200b.

Client computers 200a that desire to use the data stored by server computer 200b can access the database 270 via communications network 280. Client computers 200a request the data by way of SQL queries (e.g., update, insert, and delete) on the data stored in database 270. Debugging software (not shown in FIG. 2A for clarity) may reside on any of the computers 200a-c, and debugging may be controlled by any one of said computers 200a-c. For example, a client computer 200a may register with the server computer 200b to debug a process running on server computer 200b by way of a connection established with a second client computer 200c, or the like. It will be appreciated that any configuration of computers is equally compatible with an embodiment of the present invention. Furthermore, the computer that controls debugging, the server computer 200b, and/or the computer that hosts the process being debugged, may be the same computer, or any combination of different computers.

Database Architecture

Figure 2B:
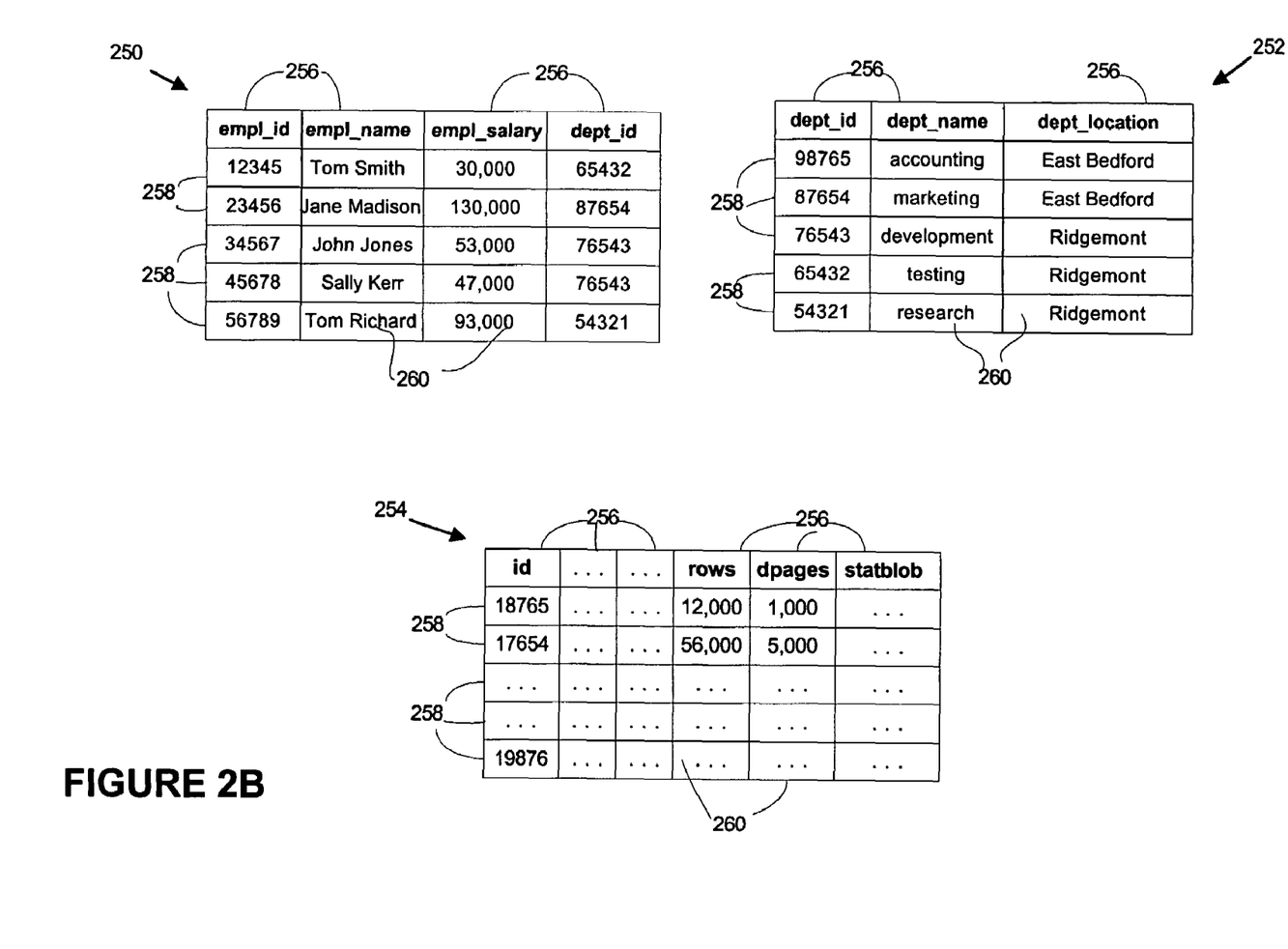
FIG. 2B is a diagram representing tables in an exemplary database.

A database is a collection of related data. In one type of database, a relational database, data is organized in a two-dimensional column and row form called a table. FIG. 2B illustrates tables such as tables 250, 252, and 254 that are stored in database 272a. A relational database typically includes multiple tables. A table may contain zero or more records and at least one field within each record. A record is a row in the table that is identified by a unique numeric called a record identifier. A field is a subdivision of a record to the extent that a column of data in the table represents the same field for each record in the table.

A database typically will also include associative structures. An example of an associative structure is an index, typically, but not necessarily, in a form of B-tree or hash index. An index provides for seeking to a specific row in a table with a near constant access time regardless of the size of the table. Associative structures are transparent to users of a database but are important to efficient operation and control of the database management system. A database management system (DBMS), and in particular a relational database management system (RDBMS) is a control system that supports database features including, but not limited to, storing data on a memory medium, retrieving data from the memory medium and updating data on the memory medium.

As shown in FIG. 2B, the exemplary database 272a comprises employee table 250, department table 252, and sysindexes table 254. Each table comprises columns 256 and rows 258 with fields 260 formed at the intersections. Exemplary employee table 250 comprises multiple columns 258 including empl_id, empl_name, empl_salary, and dept_id. Columns 258 in department table 252 include dept_id, dept_name, and dept_location. Sysindexes table 254 contains information regarding each table in the database.

Generally, data stored in a relational database is accessed by way of a user-defined query that is constructed in a query language such as T-SQL, or in managed code such as, for example, Visual Basic .NET or C#. Typically, for any given SQL query there are numerous procedural operations that need be performed on the data in order to carry out the objectives of the SQL query. For example, there may be numerous joins and table scans that need to be performed so as to accomplish the desired objective.

Figure 3:
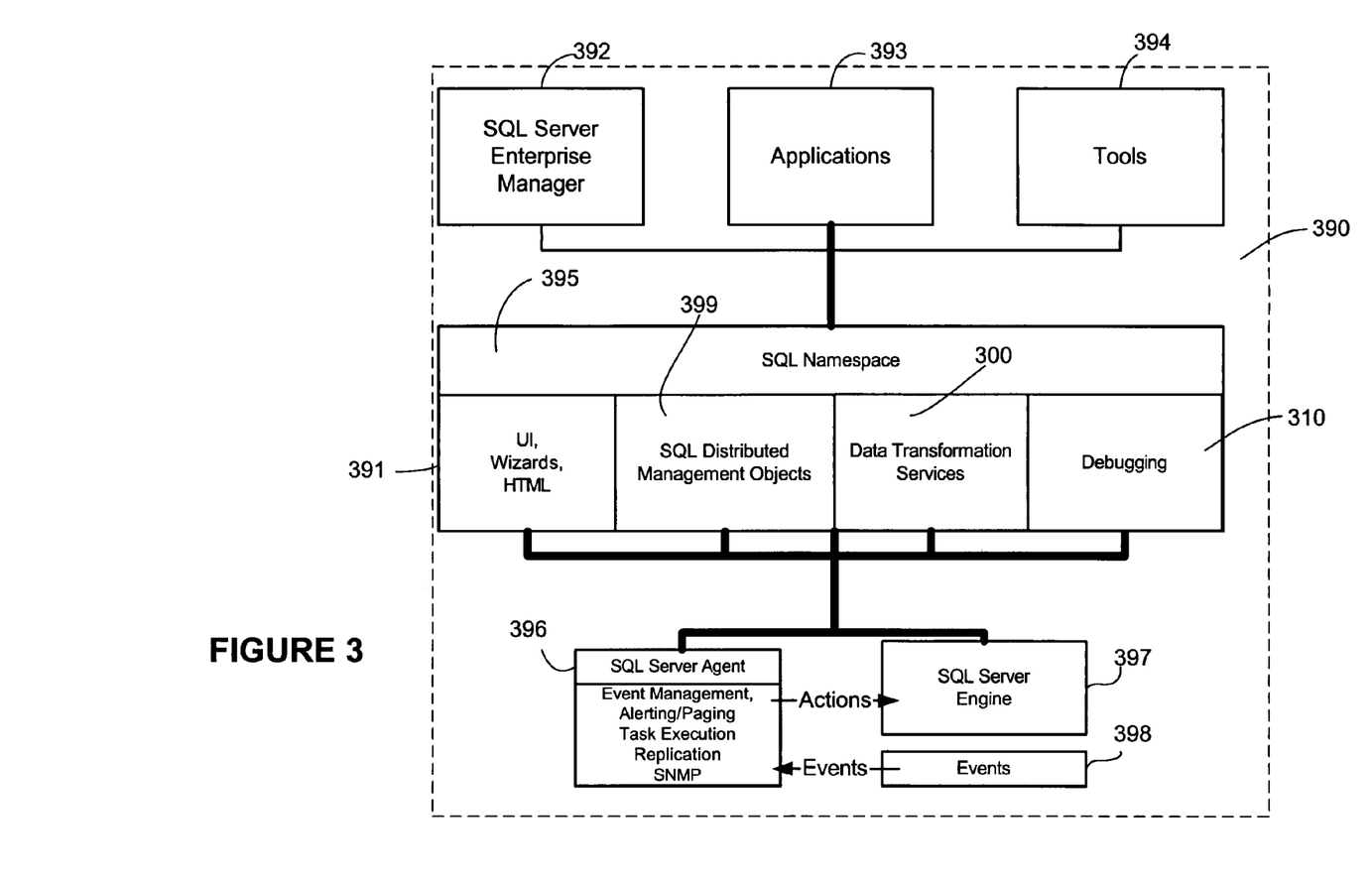
FIG. 3 is an architecture of an exemplary database management system.

As noted above, control and management of the tables is maintained by a DBMS, e.g., a RDBMS. Referring now to FIG. 3, an exemplary SQL SERVER RDBMS architecture 390 is graphically depicted. The architecture comprises essentially three layers. Layer one provides for three classes of integration with the SQL SERVER, comprising: (1) a SQL SERVER Enterprise Manager 392 that provides a common environment for managing several types of server software in a network and provides a primary interface for users who are administering copies of SQL SERVER on the network; (2) an Applications Interface 393 that allows integration of a server interface into user applications such as Distributed Component Object Modules (DCOM); and (3) a Tools Interface 394 that provides an interface for integration of administration and configuration tools developed by Independent Software Vendors (ISV).

Layer two opens the functionality of the SQL SERVER to other applications by providing Application Programming Interfaces (APIs): SQL Namespace 395, SQL Distributed Management Objects 399, Data Transformation Services 300, and, according to one embodiment of the present invention, Debugging 310. A user interface 391 is provided by Wizards, HTML, and the like. SQL Namespace API 395 exposes the user interface (UI) elements of SQL SERVER Enterprise Manager 392. This allows applications to include SQL SERVER Enterprise Manager UI elements such as dialog boxes and wizards.

SQL Distributed Management Objects API 399 abstracts the use of DDL, system stored procedures, registry information, and operating system resources, providing an API to all administration and configuration tasks for the SQL SERVER. Distributed Transformation Services API 300 exposes the services provided by SQL SERVER to aid in building data warehouses and data marts. These services provide the ability to transfer and transform data between heterogeneous OLE DB and ODBC data sources. Data from objects or the result sets of queries can be transferred at regularly scheduled times or intervals, or on an ad hoc basis. The debugging API 310 exposes the debugging and registration services provided by the SQL SERVER in accordance with an embodiment of the present invention, as will be discussed below in connection with FIGS. 4A, 4B and 5.

Layer three provides the heart of the SQL SERVER. This layer comprises a SQL SERVER Engine 397 and a SQL SERVER Agent 396 that monitors and controls SQL SERVER Engine 397 based on Events 398 that inform SQL SERVER Agent of the status of the SQL SERVER Engine 397. The SQL Server Engine processes SQL statements, forms and optimizes query execution plans, and so forth.

Debugging Architecture

Figure 4A:
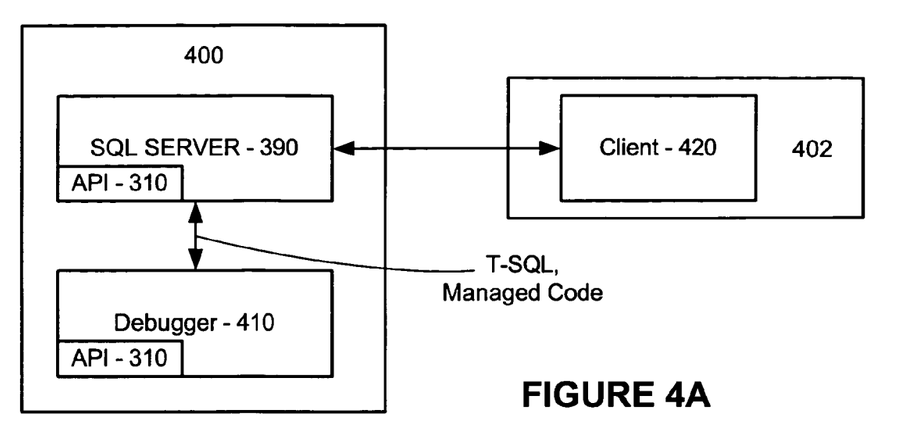
FIG. 4A is an architecture of an exemplary local debugging configuration according to an embodiment of the present invention.

Turning now to FIG. 4A, an architecture of an exemplary local debugging configuration according to an embodiment of the present invention is shown. It is herein assumed that details relating to the operational concepts pertaining to network software and such software's associated components should be known by one of skill in the art, and therefore such details are omitted herein for clarity. The configuration is referred to as "local" because the debugger 410 resides on the same computer—server computer 400—as the SQL SERVER 390. The debugging operations are therefore controlled from the server computer 400. In FIG. 4A, as well as FIG. 4B, the SQL SERVER architecture in its entirety is illustrated as the functional block referred to as SQL SERVER 390. Likewise, the SQL debugging API 310 is illustrated within the SQL SERVER 390 and debugger 410 to show which components are exposed to the debugging functionality of the SQL SERVER 390 by way of the SQL debugging API 310.

An exemplary interface definition illustrating code that defines an SQL debugging API 310 according to an embodiment of the present invention is presented in the Appendix. It will be appreciated that any such definition is equally compatible with an embodiment of the present invention, and therefore the present invention is not limited to the language, text, format, and the like, of the interface definition of the Appendix. Furthermore, the comments included in the definition are for illustrative purposes only, and are not a comprehensive listing of the functions that may be performed by an embodiment of the present invention.

It will be appreciated that the server computer 400 corresponds to, for example, server computer 200b as described above in connection with FIG. 2A. It will also be appreciated that the debugger 410 may be a stand-alone program or may be integrated into the SQL SERVER 390 as one of the components described above in the SQL SERVER 390 architecture discussion of FIG. 3. It will further be appreciated that the SQL debugging API 310 provides the means by which the debugger 410 communicates with the SQL SERVER 390. In the local debugging context depicted in FIG. 4A, the SQL debugging API 310, in one embodiment of the present invention, provides for direct debugging operations for both T-SQL and managed code between the SQL SERVER 390 and debugger 410, as represented by the arrow interconnecting the SQL SERVER 390 and debugger 410.

Figure 4B:
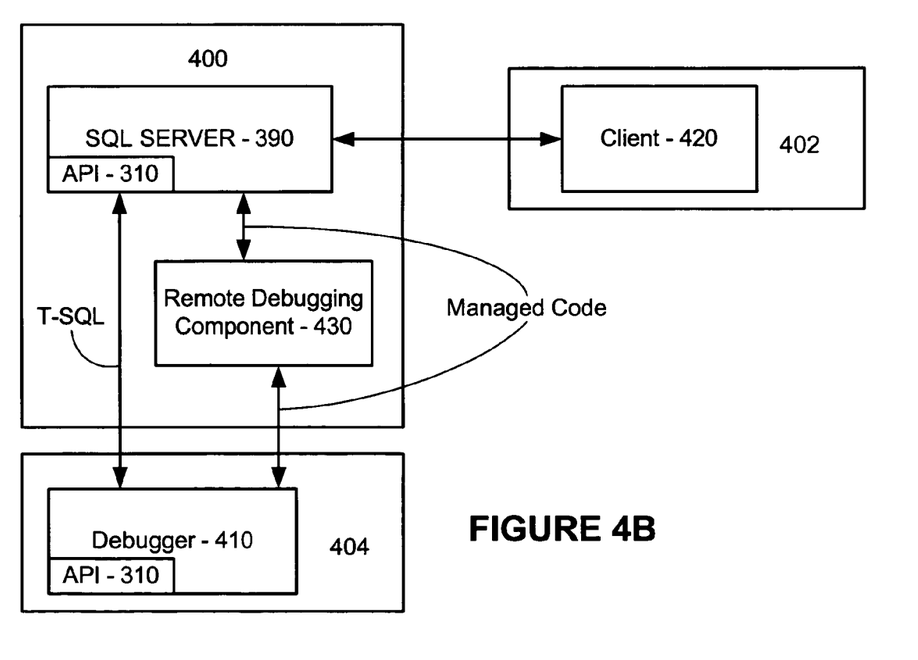
FIG. 4B is an architecture of an exemplary remote debugging configuration according to an embodiment of the present invention.

Client connection 420 is a process to be debugged that, in FIG. 4A, is running on client computer 402. As noted above, the client connection 420 may reside on any computer including, but not limited to, the client computer 402 (as depicted in FIGS. 4A and 4B), the server computer 400 or the debugging computer 404. Client connection 420 interacts with the SQL SERVER 390 on the server computer 400 using, for example, any standard method such as ADO, OLDEDB, ODBC, SQL client, SOAP over HTTP, or the like, as represented by the arrow interconnecting the SQL SERVER 390 and client connection 420. Client computer 402 may correspond, for example, to a client computer 200a as described above in connection with FIG. 2A.

Referring now to FIG. 4B, an architecture of an exemplary remote debugging configuration according to an embodiment of the present invention is illustrated. As was illustrated above in connection with FIG. 4A, a SQL SERVER 390 runs on server computer 400 while the client process runs on client computer 402. In contrast to FIG. 4A, however, the debugger runs on debugging computer 410. As noted above in connection with FIG. 2A, the debugging computer 410 may be a client computer such as computer 200a, or may be any other computing device that is in operative communications with the SQL SERVER 390. In fact, in some embodiments the debugging computer 410 and the client computer 402 may be the same computer. As represented by the arrow interconnecting the SQL SERVER 390 and debugger 410, debugging operations for T-SQL occur directly between the SQL SERVER 390 and debugger 410. However, debugging operations for managed code pass through a remote debugging component 430, as represented by the arrows interconnecting the SQL SERVER 390, remote debugging component 430 and the debugger 410. The remote debugging component 430 enables the debugger 410 to use debugger interfaces provided by the CLR, rather than by the SQL SERVER 390. Such a component 430 is necessitated by, for example, the security features of the CLR that require a debugging interface that is local to the SQL SERVER 390. It will readily be appreciated that the remote debugging component 430 is not required in embodiments where the CLR does not have such a requirement. The SQL debugging API's 310 ability to switch between T-SQL and managed code is discussed further, below.

Figure 5:
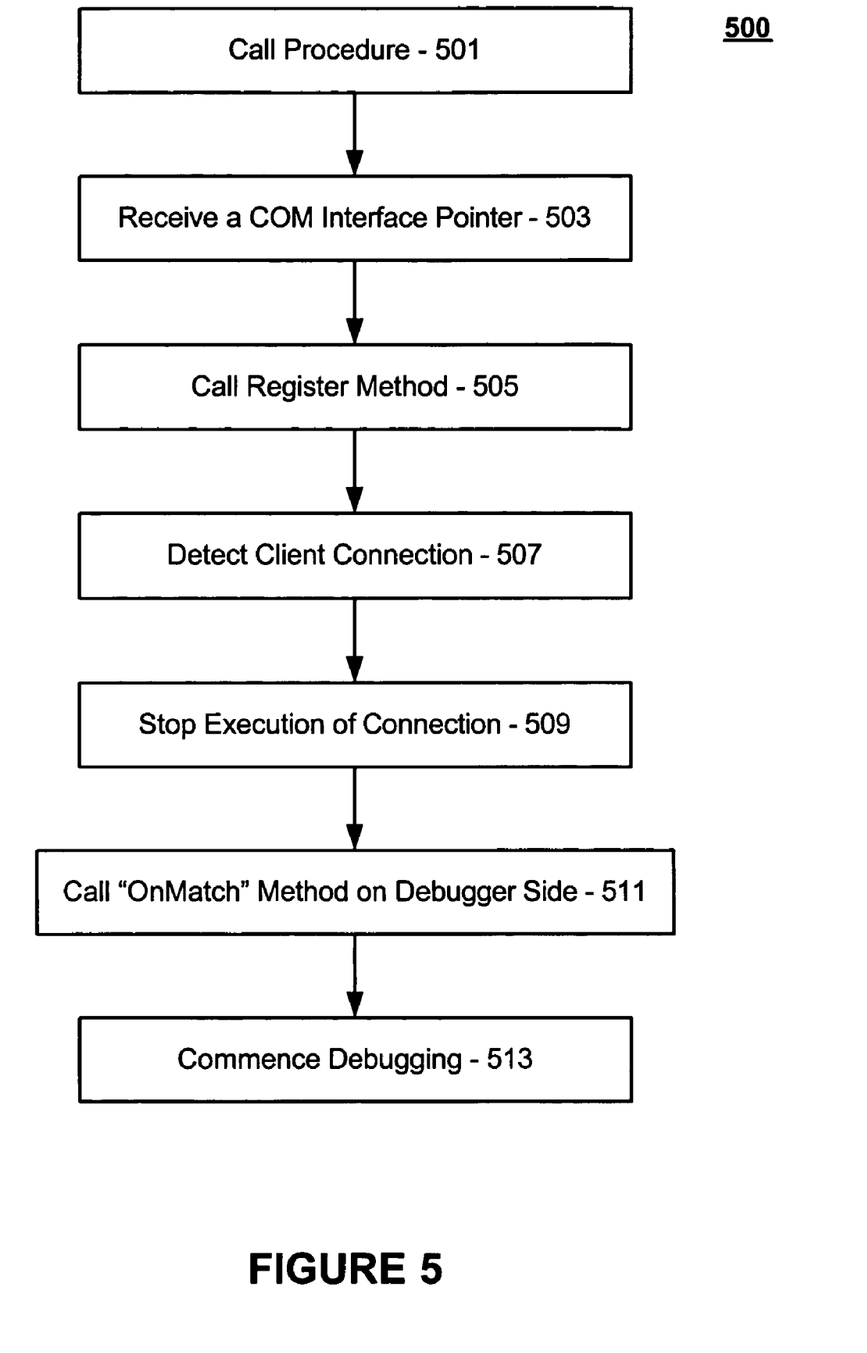
FIG. 5 is a flow diagram illustrating an exemplary method of attaching a debugger to a client connection according to an embodiment of the present invention.

Turning now to FIG. 5, a flow diagram illustrating an exemplary method 500 of attaching a debugger to a client connection 420 according to an embodiment of the present invention is shown. It will be appreciated that the method 500 of FIG. 5 also illustrates how the architecture and SQL debugging API 310 according to an embodiment of the present invention enables client and protocol independence.

At step 501, the method 500 begins when the debugger 410 calls a system stored procedure to initiate a debugging session of a client process 420 using the SQL SERVER 390. As noted above, such a method call is facilitated by the SQL debugging API 310. At step 503, an interface pointer such as, for example, a COM interface pointer, is returned to the debugger 410 by the SQL SERVER 390 (again, by way of the SQL debugging API 310). At step 505, the debugger 410 uses the interface pointer that was returned in step 503 to call a "register" method by way of, for example, DCOM. It will be appreciated that the registration process, upon completion, will enable the debugger to access a client connection 420 for debugging purposes. As part of the registration, the debugger may therefore pass certain information along to the DCOM for purposes of identifying the client connection 420 to be debugged. For example, the debugger may pass a machine name, a process ID, an interface pointer and/or the like.

At step 507, a client connection 420 is detected when the information specified in step 505, above, is matched by an incoming client connection 420. For example, when a client computer 402 having a specified machine name runs a process that is identified by the process ID on an interface specified by the interface pointer, the SQL SERVER 390 will recognize the client connection 420 as being the connection specified by the debugger 410 in step 505. As may be appreciated, other requirements may need to be met before steps 509-513 take place. For example, the client connection 420 may need to be communicating with the SQL SERVER 390 in a security context appropriate to the debugger 410 and any debugging operations that may take place.

Once the SQL SERVER 390 detects the client connection 420, the SQL SERVER 390, at step 509, stops execution of the incoming connection 420. As may be appreciated, stopping the execution of the client connection 420 will permit the SQL SERVER 390, by way of the SQL debugging API 310, to enable the debugger 410 to gain access to the client connection 420. At step 511, the SQL SERVER 390 connects the client connection 420 to the debugger 410 by, for example, calling an API such as an "OnMatch" method on the debugger 410 side by way of DCOM using the above-referenced interface pointer or the like. Thus, the debugger 410 is in operative communications with the client connection 420, and at step 513, the debugger 410 can commence debugging operations.

It will be appreciated, therefore, that the architecture's removal of client driver involvement in initiating the client connection 420 with the SQL SERVER 390 enables the debugger 410 to communicate with any client connection 420 that is capable of communicating with the SQL SERVER 390. In fact, in one embodiment of the present invention, the client connection 420 communicates with the SQL SERVER 390 without having any indication that the debugger 410 is involved. The client connection 420 merely responds to requests from the SQL SERVER 390, and does not "know" that the requests are driven by the debugger 410. Further embodiments of the present invention are also possible, and are now discussed with reference to FIGS. 4A, 4B and 5, as described above.

Conventional debuggers, as previously noted, lack the capacity to debug dynamic T-SQL stack frames. Instead, only persisted T-SQL stored procedures, triggers and functions are available to a conventional debugger. In contrast, the SQL debugging API 310, permits the fill debugging of dynamic T-SQL stack frames.

In effect, the SQL debugging API 310 extends the mechanism used for debugging persisted objects so the mechanism can be used with dynamic T-SQL stack frames. When a dynamic T-SQL frame is added to the user stack within the SQL SERVER 390, the SQL SERVER 390, by way of the SQL debugging API 310, calls a "PushDynamic" method on the debugger 410. The PushDynamic method is similar to the "Push" method used for persisted objects, but instead of passing an object ID, as would be the case for a persisted object, in one embodiment the PushDynamic method passes the text of the dynamic T-SQL. The client connection 420 may then render the text and interpret offsets in the same way it would for a persisted T-SQL object.

In another embodiment of the present invention, the SQL SERVER 390 provides a client connection 420 with the ability to create executable user objects based on managed code that runs in the CLR hosted by the SQL SERVER 390. In such an embodiment, the managed debugger 410 is attached to the SQL SERVER 390 process on demand and the SQL debugging API 310 notifies the debugger 410 of transitions between T-SQL and managed code. For example, the SQL debugging API 310 provides methods for the SQL SERVER 390 to call on the debugger 410 when a transition occurs between T-SQL and managed code (or vice versa) on the client connection 420. Exemplary methods, according to one embodiment of the present invention, are "CallManagedFromTSQL," "CallTSQLFromManaged," "ReturnToTSQLFromManaged" and "ReturnToManagedFromTSQL." (The interface definition of the Appendix includes such methods.) These methods allow the debugger 410 to "know" when the client session is executing T-SQL code and when such session is executing managed code. As a result, the debugger 410 provides a user with seamless stepping from T-SQL into managed code and vice-versa. It will be appreciated that the SQL debugging API 310 therefore enables the debugger 410 to construct a merged call stack of both T-SQL code and managed code.

As was discussed above in connection with FIG. 4B, the SQL SERVER 390 provides a mechanism by which the debugger 410 may load a component local to the SQL SERVER 390 to enable a remote debugger 410 to debug managed code running in the server. If a remote debugger 410 wishes to debug managed code running on a client connection 420 it may, at any time, call a method such as, for example, CreateManagedDebuggerHost. Such a call may include parameters such as a version identifier, argument string and/or the like. The SQL SERVER 390 then looks up the path of the local component in the registry based on the version identifier and starts the component, passing it the parameter (s) supplied by the debugger 410. The debugger 410 then communicates with this component to attach to a SQL SERVER 390 process for managed debugging.

If a debugger 410 wished to debug managed code running on the client connection 420, it would typically attach the managed debugger synchronously to receiving a "CallManagedFromTSQL" call from the server. Such a mechanism allows attachment to the managed debugger only when the debugger 410 has indicated an intention to perform managed debugging and only when managed code is actually executing on the client connection. Additionally, by combining the SQL SERVER's 390 calls to "Push" and "PushDynamic" (indicating that T-SQL stack frames have been added) with the corresponding calls from the managed debugging component, an embodiment of the present invention provides a combined call stack of T-SQL frames and the managed frames called synchronously from the T-SQL.

In a further embodiment of the present invention, the T-SQL debugging model shows a debugging user only the activity within the SQL SERVER 390 on the client connection 420 being debugged. The user may be shown such activity by way of, for example, a monitor 191 as discussed in FIG. 1, or the like. Likewise, a user debugging managed code running within the SQL SERVER 390 is provided with information scoped by the client connection 420 being debugged. Only threads associated with the current client connection 420 are therefore exposed to the user by the debugging user interface.

Thus, a method and system for debugging in a SQL SERVER environment has been provided. While the present invention has been described in connection with the exemplary embodiments of the various figures, it is to be understood that other similar embodiments may be used or modifications and additions may be made to the described embodiment for performing the same function of the present invention without deviating therefrom. For example, while an embodiment of the present invention has been described above as being implemented in Microsoft's SQL SERVER database management system, it is understood that the present invention may be implemented in any type or configuration of database software in any type of application environment. Therefore, the present invention should not be limited to any single embodiment, but rather should be construed in breadth and scope in accordance with the appended claims.

APPENDIX

An exemplary interface definition illustrating code that defines an API according to an embodiment of the present invention is presented below. As noted above, it will be appreciated that any such definition is equally compatible with an embodiment of the present invention, and therefore the present invention is not limited to the language, text, format, and the like, of the below-listed exemplary interface definition. The comments included in the definition are for illustrative purposes only, and are not a comprehensive listing of the functions that may be performed by an embodiment of the present invention.

```
// Type definitions
typedef DWORD PID;
typedef DWORD SDI_SPID;
typedef DWORD BID;
typedef DWORD WID;
typedef DWORD IDX;
typedef DWORD OFF;
typedef DWORD PRID;
typedef DWORD DBGDBID;
typedef UINT64 TASKID;
typedef DWORD NLVL;
// Forward declarations of interfaces
interface IHostDebugDebuggerInstance;
interface IHostDebugServerInstance;
interface IHostDebugEvent;
interface IHostDebug;
// Interface definitions
[
    uuid(87bc18db-c8b3-11d5-ae96-00b0d0e93cc1),
    pointer_default(unique)
]
interface IHostDebugDebuggerInstance : IUnknown
{
    HRESULT OnMatch(
        [in, string] const wchar_t * szClientMachine,
        [in] PID pidClient,
        [in] IHostDebug * pDebug,
        [out] IHostDebugEvent ** ppDebugEvent);
}
[
    uuid(87bc18dc-c8b3-11d5-ae96-00b0d0e93cc1),
    pointer_default(unique)
]
interface IHostDebugServerInstance : IUnknown
{
    HRESULT Register(
        [in, string] const wchar_t * szClientMachine,
        [in] PID pidClient,
        [in] IHostDebugDebuggerInstance * pInstance,
        [in] BOOL fReservedMustBeFalse, // DebugExistingConnections
        [out] DWORD * pdwCookie,
        [out] DWORD * pdwPidServer);
    HRESULT Unregister(
        [in] DWORD dwCookie);
}
typedef struct HOST_DEBUG_SPAN
```

-continued

```
{
    IDX m_idxStart;
    OFF m_offStart;
    OFF m_offEnd;
} HOST_DEBUG_SPAN;
typedef struct HOST_DEBUG_STATEMENT
{
    HOST_DEBUG_SPAN m_span;
        BOOL m_bDynamic;
        [switch_is(m_bDynamic)] union
        {
            [case(TRUE)] struct
            {
                BID m_bid;
                WID m_wid;
                NLVL m_nlvl;
            };
            [case(FALSE)] struct
            {
                PRID m_prid;
                [string] wchar_t * m_szDbName;
                DBGDBID m_dbid;
            };
        };
} HOST_DEBUG_STATEMENT;
typedef enum HOST_DEBUG_STEPKIND
{
        HOST_DEBUG_STEPKIND_STEPCOMPLETE = 1,
        HOST_DEBUG_STEPKIND_BREAKPOINT_HIT = 2,
        HOST_DEBUG_STEPKIND_ASYNC_BREAK = 8
} HOST_DEBUG_STEPKIND;
// This interface is implemented by the debugger and called by SQL
SERVER
[
    uuid(87bc18dd-c8b3-11d5-ae96-00b0d0e93cc1),
    pointer_default(unique)
]
interface IHostDebugEvent : IUnknown
{
    // Called on new connection to the database
    HRESULT NewConnection(
        [in] SDI_SPID spidParent,
        [in] BID bidParent,
        [in] WID widParent,
        [in] SDI_SPID spid,
        [in, string] const wchar_t * szSqlServer,
        [in, string] const wchar_t * szMachine,
        [in, string] const wchar_t * szClientMachine,
        [in, string] const wchar_t * szClientProcessName,
        [in, string] const wchar_t * szClientUserName,
        [in] PID pid,
        [in] DWORD dwThreadId);
    // Called when a new batch is started (MARS).
    // There is an implicit worker
    // (WID==0) that is assumed with this operation
    // (ie. NewWorker is not
    // called unless a UDF actually gets parallelized).
    HRESULT NewBatch(
        [in] BID bid);
    // Called for each helper that is created during
    // parallel execution of a UDF
    HRESULT NewWorker(
        [in] BID bid,
        [in] WID wid,
        [in] NLVL nlvl);
    // Called when a stored procedure is executed.
    HRESULT Push(
        [in] BID bid,
        [in] WID wid,
        [in, string] const wchar_t * szDBName,
        [in, string] const wchar_t * szObjectName,
        [in] DBGDBID dbid,
        [in] PRID prid,
        [in] NLVL nlvl,
        [in] UINT_PTR esp,
        [in] ULONG ulThreadId,
        [in] USHORT usValidSpans,
        [in, size_is(usValidSpans)] HOST_DEBUG_SPAN *
        arDebugSpan);
```

```
        HRESULT PushDynamic(
            [in] BID bid,
            [in] WID wid,
            [in] NLVL nlvl,
            [in] UINT_PTR esp,
            [in] ULONG ulThreadId,
            [in, string] wchar_t * szText,
            [in] USHORT usValidSpans,
            [in, size_is(usValidSpans)] HOST_DEBUG_SPAN *
        arDebugSpan);
        HRESULT Step(
            [in] BID bid,
            [in] WID wid,
            [in] PRID prid,
            [in] NLVL nlvl,
            [in] HOST_DEBUG_STEPKIND stepkind,
            [in] HOST_DEBUG_SPAN span,
            [in] ULONG ulThreadId);
        // Balances out calls to NewSP
        HRESULT Pop(
            [in] BID bid,
            [in] WID wid,
            [in] NLVL nlvl);
        HRESULT CloseConnection([in] SDI_SPID spid);
        HRESULT CloseBatch(
            [in] BID bid);
        HRESULT CloseWorker(
            [in] BID bid,
            [in] WID wid);
        HRESULT Trace(
            [in] BID bid,
            [in] WID wid,
            [in, string] const wchar_t * szOutput);
        HRESULT CallManagedFromTsql(
            [in] BID bid,
            [in] WID wid,
            [in] TASKID taskid);
        HRESULT ReturnToTsqlFromManaged(
            [in] BID bid,
            [in] WID wid,
            [in] TASKID taskid);
        HRESULT CallTsqlFromManaged(
            [in] BID bid,
            [in] WID wid,
            [in] TASKID taskid);
        HRESULT ReturnToManagedFromTsql(
            [in] BID bid,
            [in] WID wid,
            [in] TASKID taskid);
        HRESULT Ping( );
    }
    interface IEnumHostDebugSymbol;
    [
            uuid(87bc18df-c8b3-11d5-ae96-00b0d0e93cc1),
            pointer_default(unique)
    ]
    interface IHostDebugBinary : IUnknown
    {
            HRESULT Get(
                ULARGE_INTEGER ulOffset,
                ULONG cbToRead,
                [out, size_is(cbToRead),
                    length_is(*pcbActuallyRead)] char * arcBuf,
                [out] ULONG * pcbActuallyRead);
            HRESULT Set(
                [in] ULONG cbWrite,
                [in, size_is(cbWrite)] char * arcBuf);
            HRESULT GetSize(
                [out] DWORD * pdwSize);
    }
    typedef enum HOST_DEBUG_SYMBOL_TYPE
    {
            HOST_DEBUG_SYMBOL_TYPE_LEAF,
            HOST_DEBUG_SYMBOL_TYPE_COMPOUND,
            HOST_DEBUG_SYMBOL_TYPE_BINARY
    } HOST_DEBUG_SYMBOL_TYPE;
    typedef enum HOST_DEBUG_SYMBOL_PROPERTIES
    {
        HOST_DEBUG_SYMBOL_PROPERTIES_GLOBAL = 1,
        HOST_DEBUG_SYMBOL_PROPERTIES_LOCAL = 2,
        HOST_DEBUG_SYMBOL_PROPERTIES_PARAM = 4,
        HOST_DEBUG_SYMBOL_PROPERTIES_VAR_NA1 = 8,
        HOST_DEBUG_SYMBOL_PROPERTIES_VAR_NA2 = 16,
        HOST_DEBUG_SYMBOL_PROPERTIES_READONLY = 32,
        HOST_DEBUG_SYMBOL_PROPERTIES_NULL = 64,
        HOST_DEBUG_SYMBOL_PROPERTIES_XML = 128,
            HOST_DEBUG_SYMBOL_PROPERTIES_TEXT = 256
    } HOST_DEBUG_SYMBOL_PROPERTIES;
    // Represents a variable in SQL SERVER.
    // Allows simple types, array, and heirarchy
    typedef struct HOST_DEBUG_SYMBOL
    {
        [string] wchar_t * m_szName;
        [string] wchar_t * m_szType;
        ULONG m_ulProperties;
        HOST_DEBUG_SYMBOL_TYPE m_symbolType;
        [switch_is(m_symbolType)] union
        {
            [case(HOST_DEBUG_SYMBOL_TYPE_LEAF)] struct
            {
                [string] wchar_t * m_szValue;
            };
            [case(HOST_DEBUG_SYMBOL_TYPE_COMPOUND)] struct
            {
                    IEnumHostDebugSymbol * m_pEnum;
            };
            [case(HOST_DEBUG_SYMBOL_TYPE_BINARY)] struct
            {
                    IHostDebugBinary * m_pBinary;
            };
        };
    } HOST_DEBUG_SYMBOL;
    [
            uuid(87bc18e0-c8b3-11d5-ae96-00b0d0e93cc1),
            pointer_default(unique)
    ]
    interface IEnumHostDebugSymbol : IUnknown
    {
            HRESULT Next(
                [in] ULONG ulSymbolsToFetch,
                [out, size_is(ulSymbolsToFetch),
                    length_is(*pulSymbolsFetched)]
        HOST_DEBUG_SYMBOL * arSymbols,
                [out] ULONG * pulSymbolsFetched);
            HRESULT Skip(
                [in] ULONG ulSymbolsToSkip);
            HRESULT Reset( );
            HRESULT Clone(
                IEnumHostDebugSymbol ** ppEnum);
            HRESULT GetCount(
                [out] DWORD * pdwCount);
    }
    typedef enum HOST_DEBUG_STEP_MODE
    {
        HOST_DEBUG_STEP_INTO,
        HOST_DEBUG_STEP_OVER,
        HOST_DEBUG_STEP_TORETURN,
        HOST_DEBUG_STEP_GO
    } HOST_DEBUG_STEP_MODE;
    [
            uuid(87bc18de-c8b3-11d5-ae96-00b0d0e93cc1),
            pointer_default(unique)
    ]
    interface IHostDebug : IUnknown
    {
        HRESULT Continue(
            [in] BID bid,
            [in] WID wid,
            [in] HOST_DEBUG_STEP_MODE step);
        HRESULT StopDebugEvents( );
        HRESULT SetBreakpoints(
            [in] BOOL fEnable,
            [in] long nBreakpoints,
            [in, size_is(nBreakpoints)] HOST_DEBUG_STATEMENT *
        arBreakpoints);
        HRESULT GetCallstack(
            [in] BID bid,
            [in] WID wid,
```

-continued

```
    [out] long * pnStatements,
    [out, size_is(, *pnStatement)] HOST_DEBUG_STATEMENT **
        parStatements);
HRESULT AsyncBreak(
    [in] BID bid,
    [in] WID wid);
HRESULT RevokeBreak(
    [in] BID bid,
    [in] WID wid);
HRESULT SetSym(
    [in] BID bid,
    [in] WID wid,
    [in] NLVL nlvl,
    [in] HOST_DEBUG_SYMBOL * pSymbol);
HRESULT GetSyms(
    [in] BID bid,
    [in] WID wid,
    [in] NLVL nlvl,
    [out] USHORT * pusSymbols,
    [out, size_is(,*pusSymbols)] HOST_DEBUG_SYMBOL **
        ppSymbols);
HRESULT GetGlobalSym(
    [in] BID bid,
    [in] WID wid,
    [in, string] wchar_t * szVariable,
    [out] HOST_DEBUG_SYMBOL * pSymbol);
HRESULT LookupTaskIdentifier(
    [in] BID bid,
    [in] WID wid,
    [out] TASKID * pTaskid);
// If the debugger gets hosed,
// allow the server to continue untouched
HRESULT StopDebugging( );
HRESULT CreateManagedDebuggerHost(
        [in] wchar_t * szVersion,
            // version string passed from debugger
        [in] wchar_t * szArg);
            // argument string passed from debugger
// This is disabled by default
HRESULT ToggleManaged(
    [in] BOOL fEnableManaged);
        HRESULT Ping( );
}
```

What is claimed:

1. A software architecture comprising at least one computer readable storage medium storing computer executable instructions for debugging a distributed database application process on a client connection, the software architecture comprising:
    a server, wherein the server runs the distributed database application on a computer;
    a client, wherein the client interacts with the distributed database application by way of the client connection; and
    the client connection executes managed code hosted by the distributed database application;
    a debugger, wherein the debugger debugs the distributed database application process, and
    an application program interface (API), wherein the API receives a debugger request, via a call for a stored procedure from the debugger, to debug managed code, and causes the server to call a debugging component, and wherein the debugger debugs the managed code and wherein the API further detects a transition between Transact-Structured Query_Language (T-SQL) and managed code and calls a method to communicate the transition to the debugger.

2. The software architecture of claim 1, wherein the API receives a debugger request to debug managed code, causes the server to call a remote debugging component, and wherein the debugger debugs the managed code by way of the remote debugging component.

3. The software architecture of claim 1, wherein the debugger debugs the distributed application process according to the transition.

4. The software architecture of claim 1, wherein the debugger further comprises a user interface, wherein the user interface displays only the T-SQL activity within the server on the client connection being debugged.

5. The software architecture of claim 1, wherein the debugger further comprises a user interface, wherein said user interface displays only threads associated with the client connection.

6. The software architecture of claim 1, wherein the server detects an addition of a dynamic T-SQL frame to a user stack within the server and calls a method to pass text of the dynamic T-SQL frame to the debugger.

7. A method of communicating between a server process, a client process and a debugger process in a distributed database environment, the method comprising:
    receiving a first call for a stored procedure from the debugger process to debug managed code;
    returning an interface pointer to the debugger process responsive to the received first call;
    receiving a second call for a register method from the debugger process, wherein the second call comprises a machine name, a process ID and an interface pointer;
    detecting a client connection matching the machine name, process ID and interface pointer on the server process;
    halting execution of the client connection on the server process responsive to said detection;
    executing a third call, wherein the third call establishes operative communications between the debugger process and the client process;
    debugging the client process via an application program interface(API), wherein the API detects a transition between Transact-Structured Query_Language (T-SQL) and managed code on the client connection; and calling a method to communicate the transition to the debugger process.

8. The method of claim 7, wherein the third call uses the interface pointer received in the second call.

9. The method of claim 7, further comprising:
    detecting a request from the debugger process to debug managed code;
    calling a remote debugging component; and
    debugging the managed code by way of the remote debugging component.

10. The method of claim 7, further comprising debugging the client connection according to the transition.

11. The method of claim 7, wherein the server process is executing T-SQL code on the client connection and the debugger process is debugging the T-SQL code, and further comprising displaying, on a user interface, only the T-SQL code executed by the server process on the client connection being debugged.

12. The method of claim 7, wherein the server process is executing managed code on the client connection and the debugger process is debugging the managed code, and further comprising displaying, on a user interface, only threads associated with the managed code being debugged.

13. The method of claim 7, further comprising detecting an addition of a dynamic T-SQL frame to a user stack within the server process and calling a method to pass text of the dynamic T-SQL frame to the debugger process, and wherein debugging the client process is by way of the text of the dynamic T-SQL frame.

14. A computer-readable storage medium having computer-executable instructions for performing a method of communicating between a server process, a client process and a debugger process in a distributed database environment, the method comprising:
receiving a first call from a computer for a stored procedure from the debugger process to debug managed code on a computer;
returning an interface pointer to the debugger process responsive to the received first call;
receiving a second call from a computer for a register method from the debugger process, wherein the second call comprises a machine name, a process ID and an interface pointer;
detecting a client connection matching the machine name, process ID and interface pointer on the server process;
halting execution of the client connection on the server process responsive to said detection;
executing a third call, wherein the third call establishes operative communications between the debugger process and the client process; and
debugging the client process via an application interface (API), wherein the API detects a transition between Transact-Structured Query_Language (T-SOL) and managed code on the client connection; and
calling a method to communicate the transition to the debugger process.

15. The computer-readable storage medium of claim 14, wherein the third call uses the interface pointer received in the second call.

16. The computer-readable storage medium of claim 14, wherein the method further comprises:
detecting a request from the debugger process to debug managed code;
calling a remote debugging component; and
debugging the managed code by way of the remote debugging component.

17. The computer-readable storage medium of claim 14, wherein the method further comprises debugging the client connection according to the transition.

18. The computer-readable storage medium of claim 14, wherein the server process is executing T-SQL code on the client connection and the debugger process is debugging the T-SQL code, and wherein the method further comprises displaying, on a user interface, only the T-SQL code executed by the server process on the client connection being debugged.

19. The computer-readable storage medium of claim 14, wherein the server process is executing managed code on the client connection and the debugger process is debugging the managed code, and wherein the method further comprises displaying, on a user interface, only threads associated with the managed code being debugged.

20. The computer-readable storage medium of claim 14, wherein the method further comprises detecting an addition of a dynamic T-SQL frame to a user stack within the server process and calling a method to pass text of the dynamic T-SQL frame to the debugger process, and wherein debugging the client process is by way of the text of the dynamic T-SQL frame.

21. A method of initiating a debugging session between a debugger and a client connection on a server running a distributed database application, comprising:
specifying the client connection of managed code to be debugged by way of an API;
returning an interface pointer to the debugger by way of the API;
calling a register method, wherein the register method uses the interface pointer to detect the client connection associated with the interface pointer;
halting execution of the client connection;
enabling the debugger to debug the client connection by way of the server and the API wherein the API detects a transition between Transact-Structured Query_Language (T-SQL) and managed code on the client connection; and calling a method to communicate the transition to the debugger.

22. The method of claim 21, further comprising debugging the client connection.

23. The method of claim 21, further comprising returning a machine name and process identifier to the debugger by way of the API.

24. The method of claim 21, further comprising detecting a security context of the client connection and performing said connecting step only if the security context matches a predetermined security context.

25. The method of claim 21, wherein said calling step is by way of a distributed component object model (DCOM).

26. A computer-readable storage medium having computer-executable instructions for performing a method of initiating a debugging session between a debugger and a client connection on a server running a distributed database application, the method comprising:
specifying the client connection having managed code to be debugged by way of an API loaded on a computer;
returning an interface pointer to the debugger by way of the API on the computer;
calling a register method, wherein the register method uses the interface pointer to detect the client connection associated with the interface pointer;
halting execution of the client connection; and
enabling the debugger to debug the client connection by way of the server and the API, wherein the API detects a transition between Transact-Structured Query_Language (T-SQL) and managed code on the client connection; and
calling a method to communicate the transition to the debugger process.

27. The computer-readable storage medium of claim 26, wherein the method further comprises debugging the client connection.

* * * * *